US008170487B2

(12) United States Patent
Sahota et al.

(10) Patent No.: US 8,170,487 B2
(45) Date of Patent: May 1, 2012

(54) BASEBAND TRANSMITTER SELF-JAMMING AND INTERMODULATION CANCELLATION DEVICE

(75) Inventors: Gurkanwal S. Sahota, San Diego, CA (US); Christos Komninakis, La Jolla, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1013 days.

(21) Appl. No.: 11/346,888

(22) Filed: Feb. 3, 2006

(65) Prior Publication Data

US 2007/0184782 A1    Aug. 9, 2007

(51) Int. Cl.
*H04B 1/00* (2006.01)

(52) U.S. Cl. ....... 455/63.1; 455/296; 455/303; 455/304; 455/305

(58) Field of Classification Search .................. 455/63.1, 455/295, 302, 283, 304, 296, 303, 305; 370/345; 375/286, 222; 330/149, 151
See application file for complete search history.

(56) References Cited

U.S. PATENT DOCUMENTS

| | | | | |
|---|---|---|---|---|
| 4,995,104 | A * | 2/1991 | Gitlin | 370/201 |
| 5,668,794 | A * | 9/1997 | McCaslin et al. | 370/288 |
| 6,259,752 | B1 * | 7/2001 | Domino et al. | 375/346 |
| 6,600,792 | B2 * | 7/2003 | Antonio et al. | 375/297 |
| 6,853,675 | B1 * | 2/2005 | Oleynik | 375/130 |
| 6,944,427 | B2 * | 9/2005 | Haub et al. | 455/63.1 |
| 7,020,447 | B2 * | 3/2006 | Nagatani et al. | 455/114.3 |
| 7,116,951 | B2 * | 10/2006 | Nagode et al. | 455/126 |
| 7,155,179 | B1 * | 12/2006 | Rothenberg | 455/114.2 |
| 7,346,134 | B2 * | 3/2008 | Smith | 375/346 |
| 7,366,470 | B1 * | 4/2008 | Green et al. | 455/63.1 |
| 7,373,168 | B1 * | 5/2008 | Kumar | 455/522 |

(Continued)

FOREIGN PATENT DOCUMENTS

RU    2264037    11/2005

OTHER PUBLICATIONS

Ketchum, J. W. and Proakis, J. G., Adaptive Algorithms for Estimating and Suppressing Narrowe-Band Interference in PN Spread Spectrum Systems, May 1982, IEEE Transactions on Communications, vol. COM-30, No. 5, pp. 913-924.*
Aparin, et al. "Analysis and Reductio of Cross-Modulation Distortion in CDMA Receivers", IEEE Transactions on Microwave Theory and Techniques, vol. 51; No. 5, May 5, 2003; XP011077002.
International Search Report—PCT/US07/061538, International Search Authority—European Patent Office, Jun. 28, 2007.
Written Opinion—PCT/US07/061538, International Search Authority—European Patent Office, Jun. 28, 2007.

*Primary Examiner* — Edward Urban
*Assistant Examiner* — Ganiyu Hanidu
(74) *Attorney, Agent, or Firm* — Ramin Mobarhan

(57) ABSTRACT

Some embodiments provide a method, system, and apparatus for interference cancellation at the baseband of a receiver. A wireless communication device, having a transmitter and receiver, is provided with an adaptive circuit that cancels interference caused by transmit signals (or other signals) leaked or bled onto the receiver at baseband to facilitate detection of a received signal of interest. Some implementations provide for a circuit that approximately reconstructs the second and third order components caused by the nonlinear response of the down-conversion chain of a receiver. This reconstructed signal is then subtracted from the composite received signal to obtain a received signal of interest.

36 Claims, 6 Drawing Sheets

U.S. PATENT DOCUMENTS

| | | |
|---|---|---|
| 7,383,486 B1 * | 6/2008 | Castagna et al. .............. 714/786 |
| 7,519,323 B2 * | 4/2009 | Mohebbi ...................... 455/11.1 |
| 7,915,954 B2 * | 3/2011 | Raghupathy et al. ......... 330/149 |
| 2002/0130729 A1 * | 9/2002 | Larson et al. ................ 333/99 S |
| 2003/0021367 A1 * | 1/2003 | Smith .......................... 375/346 |
| 2004/0048576 A1 | 3/2004 | Hildebrand et al. |
| 2004/0203458 A1 | 10/2004 | Nigra |
| 2004/0246048 A1 * | 12/2004 | Leyonhjelm et al. ............. 330/2 |
| 2005/0018790 A1 * | 1/2005 | Liu ............................... 375/316 |
| 2005/0107051 A1 | 5/2005 | Aparin et al. |

* cited by examiner $a_1 \upsilon + a_2 \upsilon^2 + a_3 \upsilon^3$ (characteristic response of non-linear device)

$a_1 \{A[s_x \cos \omega_t t - s_y \sin \omega_t t] + J \cos \omega_J t\}$ (linear term)

502 — $(a_2/2)[A^2(s_x^2 + s_y^2) + J^2] + a_2 AJ[s_x \cos (\omega_t - \omega_J)t - s_y \sin (\omega_t - \omega_J)t]$ (2nd order term)

$(3a_3/4) [A^2(s_x^2 + s_y^2) + 2J^2] A[s_x \cos \omega_t t - s_y \sin \omega_t t]$ (3rd order term)

504 — $(3a_3/4) [2A^2(s_x^2 + s_y^2) + J^2] J \cos \omega_J t$ (3rd order term)

$(3a_3/2) A^2 J [(s_x^2 - s_y^2) \cos (2\omega_t - \omega_J)t - s_x s_y \sin (2\omega_t - \omega_J)t]$ (3rd order term)

$(3a_3/2) AJ^2 [s_x \cos (2\omega_J - \omega_t)t - s_y \sin(2\omega_J - \omega_t)t]$ (3rd order term)

Figure 5

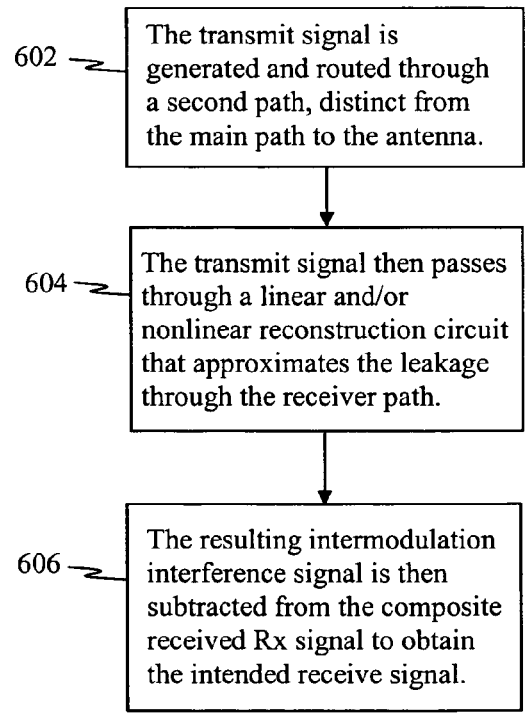

Figure 6

BASEBAND TRANSMITTER SELF-JAMMING AND INTERMODULATION CANCELLATION DEVICE

BACKGROUND

1. Field

The present invention generally relates to an apparatus, system, and method for interference cancellation in a receiver. More specifically, one feature of the invention may remove intermodulation interference, caused by transmitted signals or other signals that leak onto a receiver, at baseband.

2. Background

Many communication systems support full duplex transmissions where information (e.g., voice, digital data, video, etc.) can be sent in both directions of a communication link at the same time. This permits, for instance, two parties on different sides of a communication link to talk at the same time. Conventional full duplex communication devices transmit on one frequency and receive on a different frequency. In many communication devices (e.g., wireless telephones, cellular telephones, telephones, base stations, etc.) a transmitter and receiver share a single antenna (via a duplexer or switch), and the signal transmitted is stronger than the signal received. That is, since a transmitted signal often has to travel significant distances to reach its destination (e.g., receiving device, base station, relay station, etc.), it is likely to have significant attenuation by the time it reaches the receiving device. The transmitted signal also has to have sufficient power to be distinguishable over noise and interference perceivable at its destination.

In full duplex communication systems having a transceiver (i.e., combination of transmitter and receiver), the signal being transmitted is amplified by one or more power amplifiers (PA) prior to transmission. This amplified transmitted signal often leaks into the receiver's path due to the finite attenuation of a duplexer circuit, thus interfering with the received signal. Additionally, the receiver's path often includes interference (called "jammer signals"), which may be substantially stronger in amplitude than the desired or intended receive Rx signal.

With an ideal, perfectly linear radio frequency (RF) down-conversion chain, the transmission signal crossover would not present a problem because the transmitted and received signals occupy different frequency bands, separated by what is called the duplex frequency (e.g., 45 MHz for cellular band code-division multiple access (CDMA)). Since the stronger transmitted signal is, for instance, 45 MHz away from the received signal, a perfectly linear down-conversion chain would maintain this separation all the way to zero-frequency (baseband), where the interfering transmitted signal can be filtered out.

FIG. 1 is a block diagram illustrating a typical transmitter 102/receiver 104 arrangement for a full-duplex communication device, such as a CDMA communication device. A duplexer 106 couples the transmitter 102 and receiver 104 to permit signals to be transmitted and received through an antenna 108. The transmitter 102 typically includes a signal source 114 that generates a baseband signal ($Tx_{BB}$) that is up-converted by a mixer 115 with a transmission carrier frequency $\omega_T$ 116. The signal from the mixer 115 is then amplified by a power amplifier 118, and transmitted via the duplexer 106 and antenna 108. The receiver 104 typically includes a low noise amplifier (LNA) 120 that receives a composite receive (Rx) signal 119 from the duplexer 106. A receiver mixer 121 demodulates the signal from the receiver carrier frequency $\omega_R$ 122 to baseband and then passes it to a low pass filter 124, an analog-to-digital (A/D) converter 126, a digital low pass filter 127, and to a receiving device 128. The composite Rx signal 119 may include the leaked Tx signal 110, a jammer signal, and the intended Rx signal 112.

The Tx signal 111, which is typically much stronger than the intended Rx signal 112, often leaks through the duplexer 106 into the receiver's low noise amplifier (LNA) 120. In a typical situation for code division multiple access (CDMA), for instance, the Tx signal's 111 maximum power is approximately +28 dBm, and the duplexer's 106 transmitter-to-receiver isolation is approximately 60 dB. This means that the leaked Tx signal's 110 interfering power at the receiver's amplifier 120 is approximately −32 dBm, which is much stronger than the intended Rx signal 112 which can be as low as −100 dBm or less. If the receiver mixer 121 were perfectly linear, the frequency separation of the leaked Tx signal 110 and intended Rx signal 112 would be maintained (e.g., 45 MHz of separation), and the low-pass filter (LPF) 124 would eliminate the leaked Tx signal 110.

A circuit or component is "linear" when it applies a linear transfer function (i.e., a function which, if the input is scaled by a certain factor, causes the output to also be scaled by an identical factor) to input signals regardless of the input signals' characteristics. For instance, a component is free from nonlinearity if it applies the same scaling factor to all input signals regardless of input signal amplitude. One effect of nonlinear components is that the input signal's frequency bandwidth is broadened. For example, an input signal that initially occupies a narrow frequency bandwidth ends up occupying a wider range of frequencies. Therefore, circuits with nonlinearity often increase the bandwidth of modulated input signals.

As a result of the nonlinearity of the mixer 121, the leaked Tx signal 110 is squared and occupies the same region around baseband (i.e., 0 Hz) as the down-converted (weaker) intended Rx signal 112. Thus, the traditional receiver 104 cannot adequately filter out the leaked Tx signal 110, making it more difficult to recognize received signals.

The composite Rx signal 119 also includes one or more jammer signals that may or may not be modulated in a similar way as the leaked Tx signal 110. For example, in various implementations a jammer signal may be a tone or a modulated signal (e.g., possibly of some other wireless communications standard or network) with a center frequency close to the Rx center frequency $\omega_R$. The modulation of the transmit signal transfers (crosses) to the jammer signal. Due to the proximity of the receiver frequency $\omega_R$ to typical interference (i.e., jammer) frequencies, the frequency spectrum of the jammer signal can overlap onto the receive frequency $\omega_R$. Thus, the stronger jammer signal may overshadow the intended receive Rx signal 112, making it difficult to discern.

One way to reduce unwanted signals at the receiver 104 is to filter the amplifier 120 output to remove unwanted signals, for example, by means of a sharp RF filter, often in practice an external SAW filter 123, between LNA 120 and mixer 121. However, the external SAW filter 123 is costly and is only effective in removing the interfering Tx signal 110, not the jammer. Since the frequency spectrum of the jammer signal may occupy the same frequency space as the intended Rx signal 112, such filtering would also filter-out the intended Rx signal as well. Another technique is to filter the leaked Tx signal 110 and jammer signal from the receive path before amplification. This technique is not entirely adequate because (a) the leaked Tx signal and jammer signal may be too close to the intended Rx signal 112 to filter, and (b) large and expensive duplexers and filters may be necessary.

Thus, traditional receivers 104 typically use external SAW filters 123 in combination with a highly linear mixer to prevent leaking and filter out leaked transmission signals. However, external SAW filters are costly, and the highly linear mixers increase power consumption.

SUMMARY

One aspect of the invention concerns a wireless communication device, such as a transceiver (i.e., combination of transmitter and receiver), having a circuit that cancels intermodulation interference caused by transmit signals (or other signals) leaked or bled onto the receiver at baseband to facilitate detection of a received signal of interest.

Some implementations provide an apparatus for canceling intermodulation interference at baseband of a receiver. The apparatus comprising (a) a reconstruction circuit configured to receive a first signal, (b) approximate the nonlinear characteristics of the receiver, (c) and provide a reconstructed output signal. A signal adder receives the reconstructed output signal and subtracts it from a second signal from the receiver. The second signal may include an amplitude modulated bleed-over signal, a jammer signal, and a receive signal. Subtracting the reconstructed output signal from the second signal substantially removes interference associated with the bleed-over signal and jammer signal from the second signal. The bleed-over signal may be an attenuated, and possibly filtered, version of the first signal (e.g., a transmit signal). The reconstruction circuit may include (a) a look-up table which approximates the nonlinear characteristics of a transmitter power amplifier, (b) a circuit which produces the magnitude-squared of the transmitted leaking signal,") and (c) an adaptive filter that approximates the linear characteristics of the gain stage of the receiver. One feature enables the reconstruction circuit to provide no reconstructed output signal when the first signal is below a threshold power level.

A method is also provided for canceling receiver intermodulation interference. The method comprises (a) receiving a composite signal having intermodulation interference and a receive signal at baseband; (b) processing the composite signal through a nonlinear down-conversion circuit prior to subtracting the interference cancellation signal; (c) applying a linear and/or nonlinear conversion to a first signal to obtain an interference cancellation signal; and (d) subtracting the interference cancellation signal from the composite signal to obtain the receive signal. The first signal may be an unmodulated version of a bleed-over signal found in the composite signal. The composite signal may include an amplitude modulated bleed over signal, a jammer signal, and a receive signal. Subtracting the interference cancellation signal from the composite signal substantially removes interference associated with the bleed-over signal and/or jammer signal from the composite signal. Subtracting the interference cancellation signal from the composite signal substantially removes second and/or third order intermodulation interference from the composite signal. Applying the nonlinear conversion to the first signal includes (a) approximating the nonlinear characteristics of a transmitter power amplifier; and (b) approximating the linear characteristics of the gain stage of the receiver.

Another implementation provides a transceiver system comprising: (a) a transmitter up-conversion circuit for modulating and amplifying transmit signals; (b) a receiver down-conversion circuit for demodulating and amplifying received signals; and (c) an intermodulation cancellation circuit configured to (1) receive a first transmit signal, (2) apply a nonlinear and an adaptive linear conversion to the first transmit signal to obtain an interference cancellation signal, (3) receive a composite signal from the receiver down-conversion circuit, and (4) subtract the interference cancellation signal from the composite signal to obtain a desired receive signal. A switch may be coupled to the transmission up-conversion circuit and the receiver down-conversion circuit for coupling transmit signals to an antenna and receiving received signal from the antenna. The interference cancellation signal may be subtracted from the composite signal at baseband. Applying a nonlinear conversion to the first transmit signal includes (a) approximating the linear and/or nonlinear characteristics of the transmitter up-conversion circuit; and (b) approximating the linear and/or nonlinear characteristics of the receiver down-conversion circuit. The intermodulation cancellation circuit may be turned off when the transmit signals are below a certain power threshold.

BRIEF DESCRIPTION OF THE DRAWINGS

FIG. 5 illustrates a mathematical representation of the intermodulation product of a signal passing through a nonlinear device.

FIG. 6 illustrates a general method for canceling second and third order intermodulation interference components at baseband according to one implementation.

DETAILED DESCRIPTION

Figure 1:
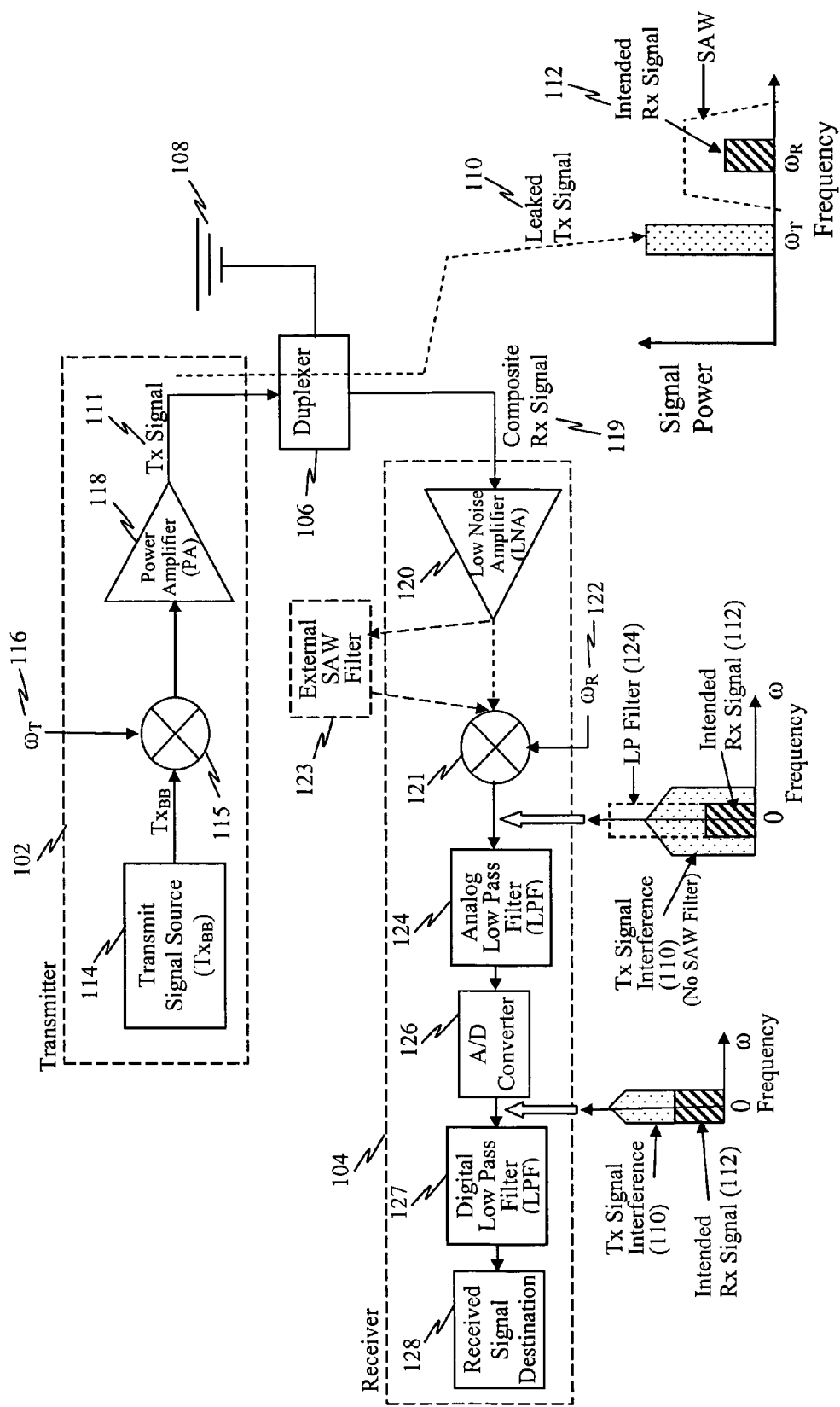
FIG. 1 is a block diagram illustrating a typical transmitter-receiver arrangement for a full-duplex communication device.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention. For instance, the term "communication device" refers to any wired or wireless device that transmits and/or receives modulated signals. The term "intermodulation" refers to all types of signal interference, cross-modulation, and jammer signals.

One aspect of the invention concerns a wireless communication device, such as a transceiver (i.e., combination of transmitter and receiver), having a circuit that cancels intermodulation interference caused by transmit signals (and/or other signals) leaked or bled onto the receiver at baseband to facilitate detection of a received signal of interest.

Figure 2:
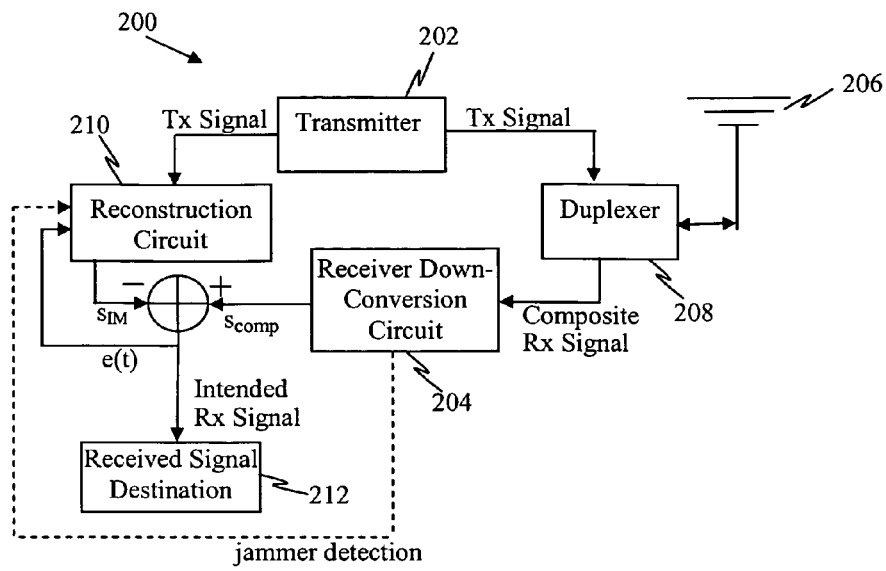
FIG. 2 is a block diagram illustrating a wireless transceiver having adaptive interference cancellation according to one embodiment.

FIG. 2 is a block diagram illustrating a wireless transceiver having adaptive interference cancellation according to one embodiment. The transceiver 200 includes a transmitter 202 and a receiver down-conversion circuit 204 coupled to an antenna 206 via a duplexer 208. The duplexer 208 directs received signals from the antenna 206 to the receiver down-conversion circuit 204, and, in the opposite direction, directs transmitted signals from the transmitter 202 to the antenna 206. The duplexer 208 may be implemented by a number of different well known designs, such as duplexers used in commercially available wireless devices. In some implementations, the duplexer 208 is applicable in CDMA systems which use different frequencies to transmit and receive. In other implementations, a switch may be substituted for the duplexer 208 for embodiments utilizing Time-Division Multiple Access (TDMA) or other encoding that use the same frequency but different time slots to send and receive data. Depending upon the details of the application, a variety of other components may be used in place of the duplexer 208 or switch to exchange transmit and receive signals with the antenna 206. Alternatively, the duplexer 208 or switch may be removed when separate antennas are used for transmitting and receiving.

The transmitter 202 may include various circuit components for encoding, modulating, amplifying, and/or otherwise processing signals for transmission. The receiver down-conversion circuit 204 may include circuit components for decoding, demodulating, filtering, amplifying, and/or otherwise processing received signals. Such components may be implemented by various known circuitry, such as that used in commercially available wireless communication devices. One or more such components of the receiver down-conversion circuit 204 may be nonlinear devices, such as an amplifier and/or mixer which serve to amplify and filter the relatively weak received signals.

An intermodulation reconstruction circuit 210 estimates or approximates the linear and/or nonlinear response of the receive path, including effects due to the duplexer 208 and receiver down-conversion circuit 204. The intermodulation reconstruction circuit 210 receives the transmitted Tx signal and applies a nonlinear as well as an adaptive linear conversion to the Tx signal to provide a reconstructed intermodulation signal $s_{IM}$. The reconstructed intermodulation signal $s_{IM}$ is then subtracted from the composite output signal $s_{comp}$ from the receiver down-conversion circuit 204 to obtain the intended receive Rx signal (i.e., received signal of interest). This intended Rx signal is then provided to the received signal destination 212.

One or more of the components and functions illustrated in FIG. 2 may be rearranged and/or combined into a single component or embodied in several components without departing from the invention. Additional elements or components may also be added without departing from the embodiment.

One problem with conventional full-duplex transmitter/receiver devices is that the radio frequency down-conversion circuitry, particularly the mixer 121 and/or amplifier 120 (FIG. 1), exhibits second and third order nonlinearity during down-conversion of the composite received signal to baseband. Such composite received signal may include the intended received signal as well as a leaked transmission signal and jammer signal.

Figure 3:
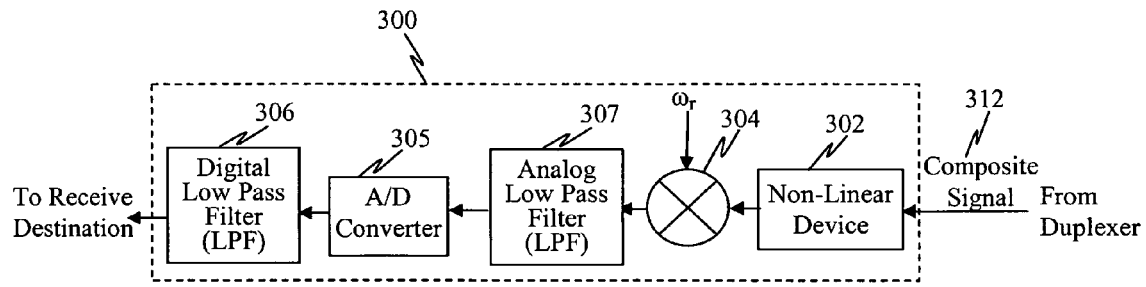
FIG. 3 is a block diagram illustrating a receiver down-conversion circuit characterized by intermodulation interference which is cancelled by an adaptive interference cancellation circuit according to an embodiment.

FIG. 3 is a block diagram illustrating a receiver down-conversion circuit 300 characterized by intermodulation interference which is cancelled by an adaptive interference cancellation circuit according to an embodiment of the present invention. The receiver down-conversion circuit 300 typically includes a possibly nonlinear device 302 coupled to a mixer 304 which is coupled to an analog, anti-aliasing lowpass filter LPF 307 which is coupled to an A/D converter 305 and then a digital lowpass filter LPF 306. The analog lowpass filter 307 serves as an anti-aliasing filter before the signal is sampled by the A/D converter 305. Digital LPF 306 is sharper and better controlled and rejects signals outside the band of the intended Rx signal. The nonlinear device 302 (e.g., amplifier) and/or mixer 304 may exhibit second and third order nonlinearities thereby generating a number of intermodulation (IM) terms when a composite signal 312 from a duplexer passes through it. In some implementations, the mixer 304 and the nonlinear device 302 may be combined into a single device having a nonlinear input stage followed by a linear output stage. A composite signal 312 from a duplexer may include a strong leaked transmit Tx signal (modulated by a transmitter frequency $\omega_t$), a jammer signal (J) (having a frequency $\omega_j$ close to the receiver frequency $\omega_r$), and the desired receive Rx signal (having receive frequency $\omega_r$).

Most of the intermodulation (IM) terms generated by the nonlinear device 302 and mixer 304 are irrelevant since they occupy frequencies outside the passband of the lowpass filter LPF 306. That is, most of the intermodulation terms are at frequencies that are filtered by the lowpass filter LFP 306.

Figure 4:
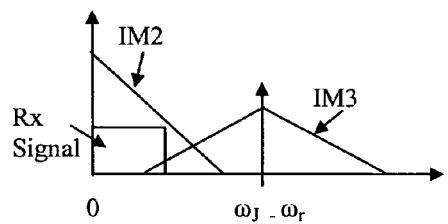
FIG. 4 illustrates a graph showing a desired received signal at baseband as well as a second order intermodulation product ("IM2") and third order intermodulation product ("IM3").

However, some second and third order IM products may be relevant. FIG. 4 illustrates a graph showing a desired received Rx signal (i.e., receive signal of interest) at baseband as well as a second order intermodulation product ("IM2") and third order intermodulation product ("IM3"). FIG. 5 illustrates a mathematical representation of the intermodulation product of a signal passing through a nonlinear device. The characteristic response of the nonlinear device may be modeled as $a_1v+a_2v^2+a_3v^3$, where the linear term may be defined as: $A[s_x \cos \omega_t t - s_y \sin \omega' t] + J \cos \omega_j t$, where A is the duplexer attenuation, $s_x$ and $s_y$ are baseband components of the Tx signal s(t) (where $s(t)=s_x+js_y$), $\omega_t$ is the transmit frequency, and J is the jammer signal amplitude. The second and third order terms are also shown. The relevant nonlinear terms 502 (IM2 in FIG. 4) and 504 (IM3 in FIG. 4) are those whose spectra lies near the baseband of the receive Rx signal (FIG. 4). The remaining terms are translated by the mixer 304 to frequencies that are attenuated by the filter LPF 306, and, hence, can be ignored. Due to second order nonlinearity, the interfering modulated Tx signal second order term $|s(t)|^2$ is located at or near DC (i.e., baseband) and leaks through the mixer 304 (IM2 in FIG. 4). Also, due to the third order nonlinearity, the intermodulation product of Tx signal $|s(t)|^2$ with the Jammer signal (IM3 in FIG. 4) is down-converted close to DC (i.e., baseband) and interferes with the intended Rx signal.

In traditional RF front-end receiver architectures, second and third order interference is often reduced by placing a sharp, and thus often external and expensive, bandpass filter immediately after a low-noise amplifier (e.g., LNA 120 in FIG. 1). This way, the interfering Tx signal in the receiver path is eliminated early in the down-conversion chain, so there are no IM products downstream. However, the receiver's bandpass filter (usually a SAW filter because of the sharp frequency response required) is expensive itself and also adds to board area and pins for integrated receivers.

Other existing methods to cancel the strong interfering signal from a transmitter include adaptive cancellation at the RF frequency before a down-conversion circuit. This circuitry is built with analog components, and hence is likely to be inaccurate, consume power, and inject extra noise into the receiver down-conversion chain, thereby increasing the overall noise of the receiver.

An alternative solution is to build a perfectly linear down-conversion chain, in an effort to eliminate the nonlinear distortion that causes the intermodulation issues. But the relatively high cost of such a highly linear RF down-conversion chain is typically unacceptable. Enhancing the linearity of RF circuitry increases the area occupied on a chip as well as power consumption.

One aspect of the invention addresses the shortcomings of conventional intermodulation cancellation approaches by providing an intermodulation reconstruction circuit (after the receiver's down-conversion chain) that recreates the second and third order intermodulation components (e.g., IM2 and IM3) and subtracts them from the composite received signal. The apparatus cancels the interference caused by a leaked Tx signal at baseband, after the second and third order nonlinear distortion of a receiver mixer has been applied. This solution does not need a bandpass filter after the receiver's low-noise amplifier, nor does it need cancellation of the leaked Tx signal at high RF frequencies.

FIG. 6 illustrates a general method for canceling second and third order intermodulation interference components at baseband according to one implementation. Generally, the transmitted intermodulation interference signal (both second and third order IM) is approximately reconstructed, including the linear and/or nonlinear response of the leakage path from the transmitter to the receiver, and subtracted from the composite received signal. The transmit signal is generated and routed through a second path, distinct from the main path to the antenna 602. The transmit signal then passes through a linear and/or nonlinear reconstruction circuit that approximates the leakage through the receiver path 604, including the duplexer and nonlinear components. The resulting intermodulation interference signal is then subtracted from the composite received Rx signal to obtain the intended receive signal 606.

Figure 7:
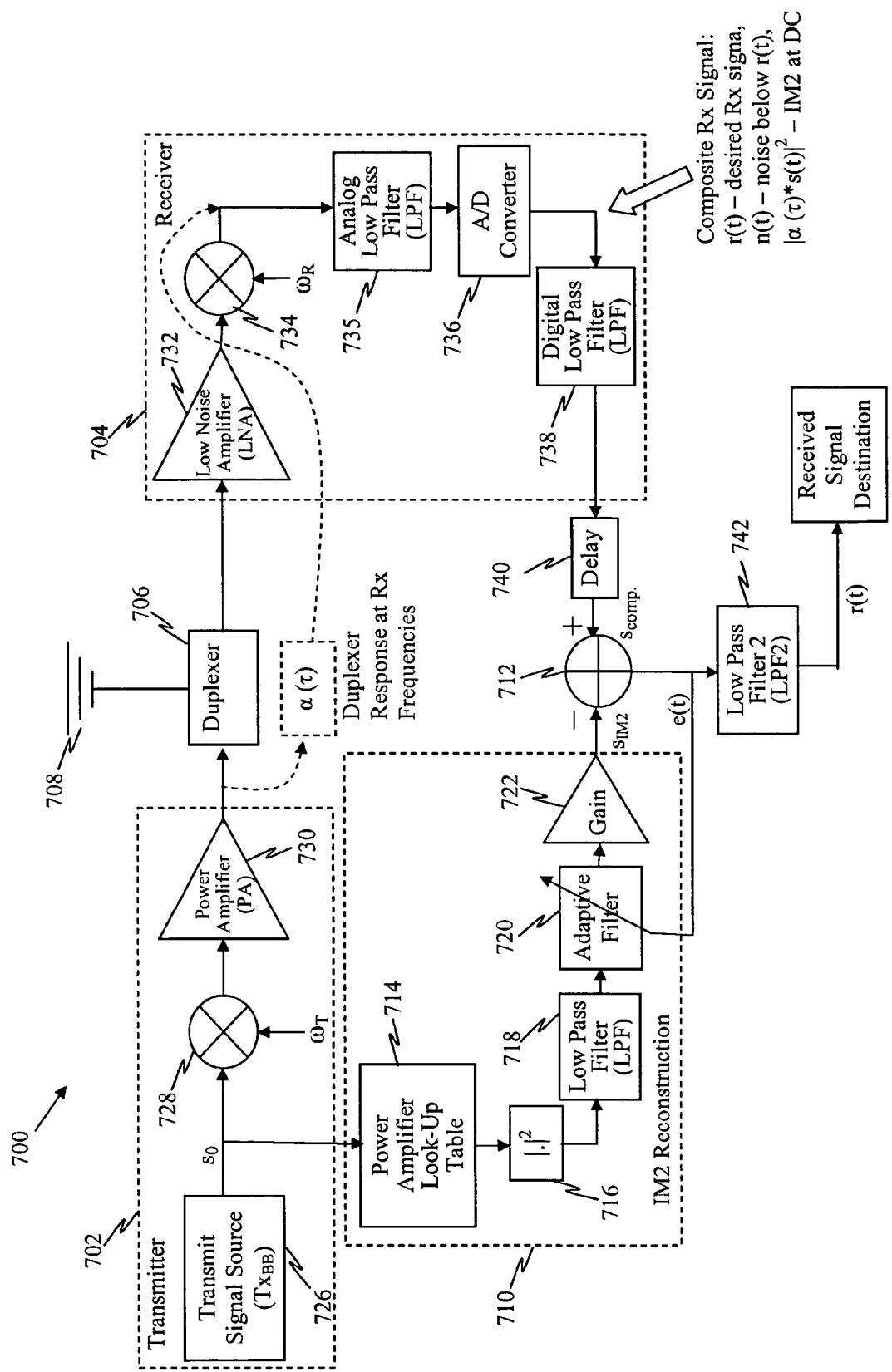
FIG. 7 is a block diagram illustrating a transceiver having an adaptive second order intermodulation cancellation circuit according to one implementation.

FIG. 7 is a block diagram illustrating a transceiver 700 having an adaptive second order intermodulation cancellation circuit according to one implementation. The transceiver 700 includes a transmitter 702 and a receiver down-conversion circuit 704 coupled to a duplexer 706 to transmit and receive signals through antenna 708. The transmitter 702 includes a Tx signal source 726 coupled to an up-conversion chain having a mixer 728 that modulates the Tx signal $s_0$ with a transmission carrier frequency $\omega_T$ before a power amplifier 730 amplifies the signal for transmission through duplexer 706 and antenna 708. The receiver down-conversion circuit 704 includes a low-noise amplifier 732 that receives a composite received signal from the duplexer 706, a mixer 734 that demodulates the Rx signal with a receiver carrier frequency $\omega_R$, an analog lowpass filter 735 removes aliasing from the signal, an A/D converter 736 processes the signal, and a digital low pass filter 738 filters the remaining signal outside the band of the intended Rx signal. Note that various implementations may employ just the analog lowpass filter 735, the digital lowpass filter 738, or both filters.

A second order intermodulation reconstruction circuit 710 receives the transmit signal $s_0$ from the transmitter 702 and approximates or replicates the linear and nonlinear response of the leakage path from the transmitter 702 through the receiver down-conversion circuit 704. The reconstruction circuit 710 provides an approximate second order intermodulation signal SIM2 that is subtracted 712 from a composite received signal $s_{comp}$ from the receiver 704 to obtain the intended receive signal r(t) plus unavoidable white noise.

Since the baseband Tx waveform $s_0$ is known, as it originates in the baseband transmit signal source 726, it is passed through a power amplifier lookup table 714 that mimics the nonlinear effect of the transmitter power amplifier 730, the duplexer 706, and low noise amplifier 732 and other known nonlinearities that the Tx signal $s_0$ undergoes before reaching the mixer 734. The resulting waveform from the look-up table 714 is squared 716 (to mimic the effect of the mixer 734), and passed through a low pass filter 718 which mimics the composite effect of analog low pass filter 735 and digital low pass filter 738. The signal from the low pass filter 718 then passes through a linear adaptive filter 720, and the result is multiplied by a scalar gain 722. This circuit 714, 716, 720, and 722 attempts to adaptively match the linear and nonlinear gain of the IM2 interference caused by the power amplifier 730, duplexer 706, low noise amplifier 732, and mixer 734 before reaching the analog-to-digital converter 736 at a certain power level.

In some implementations, this gain stage 716 and 718 can be avoided by incorporating the gain into the coefficients (taps) of the linear adaptive filter 720. However, the gain stage 722 can help to limit the range of variation (dynamic range) of the adaptive filter 720 taps to reasonable values, effectively normalizing the taps. Assuming that the second-order intercept point of the mixer 734 is known, then the power of the IM2 interference product is given by:

$$P_{IM2} [dBm] = 2(P_{Tx} [dBm] - \text{DuplexerAttenuation} [dB]) - IIP2 [dBm] \quad \text{(Equation 1)}$$

where the transmit signal $s_0$ power ($P_{Tx}$) is known, the duplexer 706 receiver attenuation $\alpha(\tau)$ is unknown but within some range provided by the manufacturer, and the second order intercept point IIP2 of the mixer 734 is also known with fairly good accuracy by the chip designers. Equation 1 is used by the reconstruction circuit 710 to predict the power level with which the IM2 product reaches the A/D converter 736, and therefore the gain 722 can be set accordingly so that the adaptive filter 720 is normalized.

The adaptation of the linear adaptive filter 720 may be guided by a feedback error signal e(t), which is obtained by subtracting 712 the reconstructed IM2 interference $S_{IM2}$ from the composite signal $s_{comp}$ coming out of the receiver 704, thereby leaving the error signal e(t) to contain only the intended receive signal r(t).

An adaptive algorithm implemented by the adaptive filter 720, which can be Least Mean Square (LMS), or Normalized LMS (NLMS), or Recursive Least Square (RLS) or any other adaptive algorithm, guides the adaptation of the taps of the filter 720 in such a way that it results in minimization of the mean-squared error. For example, with an LMS adaptive algorithm, the update equation for the vector w of filter taps at time index t (based on their value at time index t−1) is:

$$w_t = w_{t-1} + \mu \cdot u_t \cdot e(t) \quad \text{(Equation 2)}$$

where e(t) is the error signal, $\mu$ is a constant, and $u_t$ is a vector with the contents of the tapped delay line of the adaptive filter at time index t. The purpose of the delay 740 in the receive path is to center the most significant coefficients (taps) of the adaptive filter 720 towards its center, assuming the duplexer 706 characteristics are approximately flat or linear across the receiver band.

A second filter 742 may be used to remove white noise from the error signal e(t) to obtain the receive signal r(t). Thus, the second order reconstruction circuit 710 is able to cancel second order IM interference from the composite receive signal $s_{comp}$ and provide the intended receive signal r(t).

Figure 8:
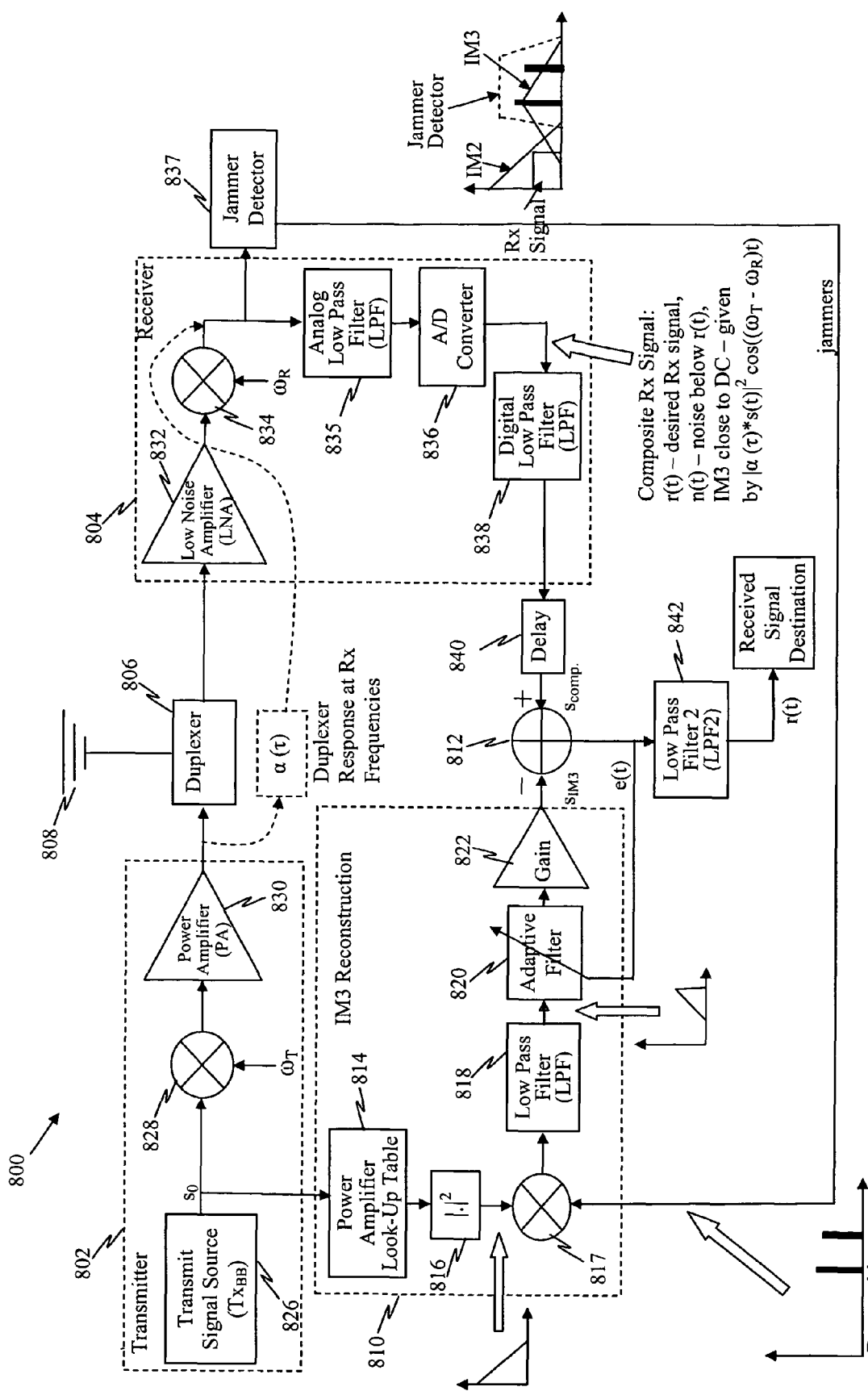
FIG. 8 is a block diagram illustrating a transceiver having an adaptive third order intermodulation cancellation circuit according to one implementation.

FIG. 8 is a block diagram illustrating a transceiver 800 having an adaptive third order intermodulation cancellation circuit according to one implementation. The transceiver 800 includes a transmitter 802 and a receiver down-conversion circuit 804 coupled to a duplexer 806 to transmit and receive signals through antenna 808. The transmitter 802 includes a Tx signal source 826 coupled to an up-conversion chain having a mixer 828 that modulates the Tx signal $s_0$ with a transmission carrier frequency $\omega_T$ before a power amplifier 830 amplifies the signal for transmission through duplexer 806 and antenna 808. The receiver down-conversion circuit 804 includes a low-noise amplifier 832 that receives a composite received signal from the duplexer 806, a mixer 834 that demodulates the Rx signal from the receiver carrier frequency $\omega_R$ to baseband, an analog lowpass filter 835 removes aliasing from the signal, an A/D converter 836 that digitizes the signal, and a digital low pass filter 838 that filters the remaining signal outside the band of the intended Rx signal.

A third order intermodulation reconstruction circuit 810 operates similar to the second order intermodulation circuit in FIG. 7 with the addition of a jammer detector 837 and a mixer 817 in the IM3 reconstruction path. The third order intermodulation reconstruction circuit 810 receives the transmit signal $s_0$ from the transmitter 802 and approximates or replicates the nonlinear response of the leakage path from the transmitter 802 through the receiver down-conversion circuit 804. The third order intermodulation reconstruction circuit 810 provides an approximate third order intermodulation signal $S_{IM3}$ that is subtracted 812 from a composite signal $s_{comp}$ from the receiver down-conversion circuit 804 to obtain the intended receive signal r(t) plus unavoidable white noise.

Since the baseband Tx waveform $s_0$ is known, as it originates in the baseband transmit signal source 826, it is passed through a power amplifier lookup table 814 that mimics the effect of the transmitter power amplifier 830, duplexer 806, and low noise amplifier 832 and other known nonlinearities that the Tx signal $s_0$ undergoes before reaching the mixer 834. The resulting waveform from the look-up table 814 is squared 816 (mimicking the effect of the mixer 834), and passed through a mixer 817 that modulates the signal based on the jammer or jammers near DC (baseband). The jammer(s) near DC (baseband) are obtained from a jammer detector 837 coupled to the receiver down-conversion circuit 804. In some embodiments, the jammer detector 837 may be a bandpass filter, or even a lowpass filter, or any other jammer detection mechanism. The signal then passes through the low pass filter 818 which mimics the composite behavior of the analog lowpass filter 835 and digital lowpass filter 838. A linear adaptive filter 820 takes the resulting signal, processes it according to an adaptive algorithm, and passes the resulting signal to a scalar gain 822. This circuit 814, 816, 817, 820, and 822 attempts to match the gain of the IM3 interference caused by the duplexer 806, amplifier 832 and mixer 834 before reaching the analog-to-digital converter 836 at a certain power level. The adaptive filter 820 may implement an adaptive algorithm similar to that of filter 720 in FIG. 7.

The reconstructed spectrum after the filter 818 is shown. If cancellation is perfect, it will match the IM3 content in the Rx path after the A/D converter. The detected jammers are needed to multiply (i.e., shift in frequency) the squared Tx signal, before it goes into the adaptive filter 820, so that the IM3 product is reconstructed. The reconstructed IM3 product $S_{IM3}$ is then subtracted 812 from the composite received signal $s_{comp}$ coming from the receiver down-conversion circuit 804 to obtain signal e(t), which is composed of the intended received signal r(t) plus white noise n(t).

The intermodulation cancellation schemes at baseband presented in FIGS. 7 and 8 may have several advantages over the existing solutions. First, they can be integrated into a receiver since no external components (such as SAW filters) are used. Secondly, this solution may save area on a receiver and use less power since all the operations are done in baseband where circuitry is much smaller and more efficient. Third, the cancellation schemes do not add noise to the analog RF down-conversion chain because everything is done digitally at baseband with arbitrarily high accuracy (e.g., the bit-widths of the adaptive filter and other baseband blocks can be as long as desired to obtain accuracy). The intermodulation cancellation schemes are particularly well suited to modern integrated implementations of transmitter and receiver circuitry on the same chip, where the receiver has knowledge of important parameters, like the transmission power, which is provided in a CDMA system through power control.

Referring to both FIGS. 7 and 8, the power amplifier look-up tables 714/814 may include known nonlinearities that are applied to the leaking strong Tx signal prior to squaring (i.e., prior to encountering the mixer 734/834). The look-up tables 714 and 814 provide conversion coefficients, at different power levels, that mimic the nonlinear response expected from the power amplifier 730/830, duplexer 706/806, low noise amplifier 732/832, and other components along the receiver path before the A/D converter 736/836. While the look-up tables 714 and 814 are an optional component of the adaptive algorithms, using them may significantly improve the cancellation performance because the nonlinear distortion they mimic is not captured and/or replicated by the linear adaptive filters 720/820.

Another consideration is the design of the lowpass filters 718, 738, and 742 (FIG. 7) and 818, 838 and 842 (FIG. 8). In particular, the bandwidth of filters 718, 735/738 (FIG. 7) and 818, 835/838 (FIG. 8) should be wider than that of the second filter 742 (FIG. 7) and 842 (FIG. 8) so that there is more interference (IM2 or IM3) after the filters 718, 735/738 (FIG. 7) and 818, 835/838 (FIG. 8) to be correlated with the composite received signal after the A/D converter 736/836 in the receive path. However, if the filter 718, 735/738 (FIG. 7) and 818, 835/838 (FIG. 8) bandwidth is made too wide, a lot more noise is allowed into the comparison, and performance degrades. So, in the presence of the second filter 742/842 (which is fixed to the intended Rx signal bandwidth), there is an optimum value for the bandwidth of filters 718, 735/738 (FIG. 7) and 818, 835/838 (FIG. 8).

The adaptive cancellation schemes discussed herein may also work well in the absence of the second filter 742/842, whereby the lowpass filtering is performed by filter 735/738 and 835/838, which has its bandwidth fixed to the bandwidth of the intended Rx signal r(t).

Another feature provides faster convergence of the adaptive filter 720/820. It is often beneficial to start with filter coefficients (taps) having values [0 . . . 0 1 0 . . . 0], i.e., with only the D-th tap being unity, where D is the delay 740/840 in FIGS. 7 and 8. This assumes that the power estimate of Equation (1) is correct, and that the duplexer characteristic response is relatively flat over the frequencies occupied by the Tx. Typically, both of those assumptions are close to being true in practice, and small adaptations of the adaptive filter 720/820 taps can then be performed based on the chosen adaptation rule (e.g., Equation (2): $w_t = w_{t-1} + \mu \cdot u_t \cdot e(t)$) for the filter algorithm. This initialization of the adaptive filter 720/820 taps is different from the often used method of initializing all taps of adaptive filters to zero, and allowing the adaptation to guide them towards their correct values. In one embodiment, this unique initialization is used because it results in faster convergence. It is important to choose a small adaptation constant $\mu$ for the adaptation algorithm of Equation (2), for two reasons. First, after the adaptive filters 720/820 converge, a smaller $\mu$ guarantees smaller residual error. Secondly, a smaller $\mu$ allows the adaptive filter taps to become very small (i.e., effectively allowing the adaptive filter to switch itself Off) in the case where the Tx power is very low (i.e., low enough to produce negligible amount of IM2). In that case, the task of the adaptive filter 720/820 becomes increasingly hard, namely to discover a very low IM2 product buried under the intended Rx signal and noise. If the constant $\mu$ is not very small, the adaptation would wander aimlessly, producing a wrong reconstructed IM2 and hindering the receiver more than if it did nothing at all. So, for low IM2 power, $\mu$ is small, because then (i.e., in very low IM2 situations) the adaptive filter 720/820 turns itself Off. The result is that nothing is subtracted from the composite received signal $s_{comp}$ at the comparator 712/812. Alternatively, this task of switching the adaptive filter Off for very low IM2 powers can be done by the receiver 704 when it detects that the transmit power is low, thus saving the effort (i.e., power) of running the reconstruction circuits 710/810 when they are not useful.

In one implementation of the invention, the second order IM2 cancellation circuit of FIG. 7 and the third order IM3 cancellation circuit of FIG. 8 may be combined into a single circuit thereby saving implementation costs and space. One or more of the components and functions illustrated in FIGS. 7 and 8 may be rearranged and/or combined into a single component or embodied in several components without departing from the implementation. Additional elements or components may also be added without departing from the implementation.

In various implementations, one or more functions of the reconstruction and cancellation circuits illustrated in FIGS. 2, 7 and 8 may be implemented by a processing unit configured to perform one or more functions of the second and/or third order intermodulation reconstruction circuits 710 and 810.

Figure 9:
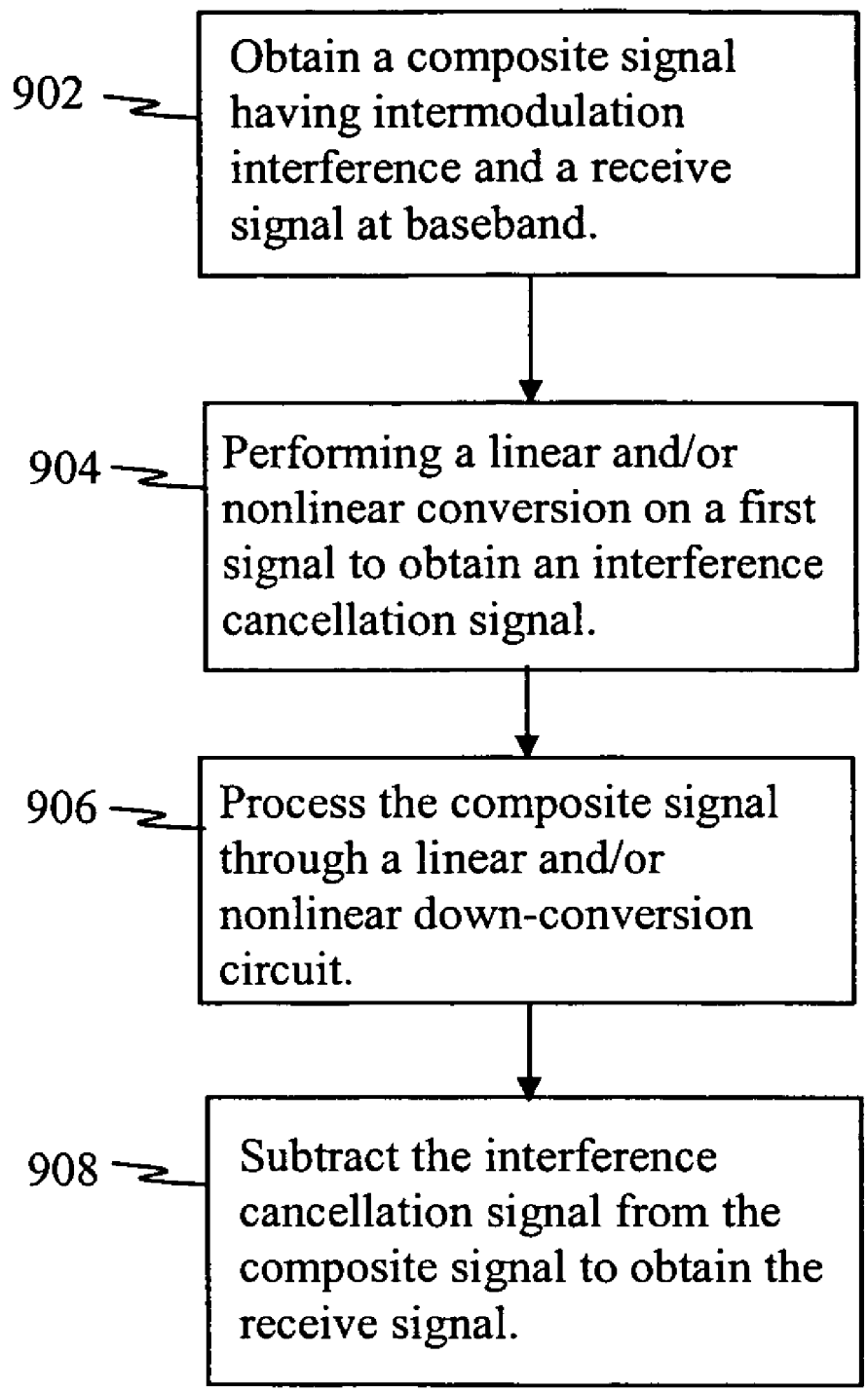
FIG. 9 illustrates a method for canceling receiver intermodulation interference at baseband according to one implementation.

FIG. 9 illustrates a method for adaptively canceling receiver intermodulation interference at baseband according to one implementation. This method may be implemented, for example, by a circuit and/or processor in various implementations. A composite signal, having intermodulation interference and a receive signal, at baseband is obtained 902. A linear and/or nonlinear conversion is performed on a first signal to obtain an interference cancellation signal 904. The interference cancellation signal is subtracted from the composite signal to obtain the receive signal 908. The composite signal may be processed through a linear and/or nonlinear down-conversion circuit 906 prior to subtracting the interference cancellation signal. The nonlinear conversion may approximate the nonlinear characteristics of a transmitter power amplifier and the nonlinear characteristics of the gain stage of the receiver. Similarly, the linear conversion approximates the linear characteristics along the transmitter and leaked paths.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for canceling intermodulation interference at baseband of a receiver, comprising:
    a reconstruction circuit configured to receive a first signal, approximate the linear and nonlinear characteristics of a transmit leakage path from a transmitter to the receiver, determine a normalization based on a power level of a transmit signal predicted at an analog-to-digital conversion in the transmit leakage path, and provide a reconstructed output signal based upon applying the characteristics and the normalization to the first signal; and
    a signal adder configured to receive the reconstructed output signal and subtract it from a second signal from the receiver.

2. The apparatus of claim 1 wherein the second signal includes an amplitude modulated bleed-over signal and a receive signal, and subtracting the reconstructed output signal from the second signal substantially removes interference associated the bleed-over signal from the second signal.

3. The apparatus of claim 2 wherein the bleed-over signal is an attenuated version of the first signal.

4. The apparatus of claim 1 wherein the second signal includes a receive signal and a jammer signal, and subtracting the reconstructed output signal from the second signal substantially removes interference associated with the jammer signal from the second signal.

5. The apparatus of claim 1 wherein the second signal includes a modulated bleed over signal, a jammer signal, and a receive signal.

6. The apparatus of claim 5 wherein subtracting the reconstructed output signal from the second signal substantially removes interference associated with the bleed-over signal and jammer signal from the second signal.

7. The apparatus of claim 1 wherein subtracting the reconstructed output signal from the second signal substantially removes second order intermodulation interference from the second signal.

8. The apparatus of claim 1 wherein subtracting the reconstructed output signal from the second signal substantially removes third order intermodulation interference from the second signal.

9. The apparatus of claim 1 wherein the first signal has a different frequency than the second signal.

10. The apparatus of claim 1 wherein the reconstruction circuit includes an adaptive filter that is adapted based on the output from the signal adder.

11. The apparatus of claim 1 wherein the reconstruction circuit includes
   a look-up table that approximates the nonlinear characteristics of a transmitter power amplifier; and
   an adaptive filter that approximates the linear characteristics of a duplexer and a receiver.

12. The apparatus of claim 11 wherein the reconstruction circuit further includes a lowpass filter that approximates the response of one or more lowpass filters in the receiver.

13. The apparatus of claim 1 further comprising:
   a jammer detector coupled to the receiver to detect a jammer signal in the receiver and provide it to the reconstruction circuit,
   wherein the reconstruction circuit is configured to add the jammer signal to the reconstructed output signal.

14. The apparatus of claim 1 wherein if the first signal is below a threshold power level, the reconstruction circuit is configured to provide no reconstructed output signal.

15. An apparatus for canceling receiver intermodulation interference, comprising:
   means for receiving a composite signal having intermodulation interference and a receive signal at baseband;
   means for performing a linear and nonlinear conversion and a normalization based on a power level of a transmit signal predicted at an analog-to-digital conversion in a transmit leakage path of the composite signal on a first signal to obtain an interference cancellation signal; and
   means for subtracting the interference cancellation signal from the composite signal to obtain the receive signal.

16. A method for canceling receiver intermodulation interference, comprising:
   receiving a composite signal having intermodulation interference and a receive signal at baseband;
   performing a linear and nonlinear conversion and a normalization based on a power level of a transmit signal predicted at an analog-to-digital conversion in a transmit leakage path of the composite signal on a first signal to obtain an interference cancellation signal; and
   subtracting the interference cancellation signal from the composite signal to obtain the receive signal.

17. The method of claim 16 further comprising:
   processing the composite signal through a linear and nonlinear down-conversion circuit prior to subtracting the interference cancellation signal.

18. The method of claim 16 wherein the first signal is an unmodulated version of a bleed-over signal found in the composite signal.

19. The method of claim 16 wherein the composite signal includes an amplitude modulated bleed over signal, a jammer signal, and a receive signal and subtracting the interference cancellation signal from the composite signal substantially removes interference associated with the bleed-over signal and jammer signal from the composite signal.

20. The method of claim 16 wherein the composite signal includes a receive signal and a jammer signal and subtracting the interference cancellation signal from the composite signal substantially removes interference associated with the jammer signal from the composite signal.

21. The method of claim 16 wherein subtracting the interference cancellation signal from the composite signal substantially removes second order intermodulation interference from the composite signal.

22. The method of claim 16 wherein subtracting the interference cancellation signal from the composite signal substantially removes third order intermodulation interference from the composite signal.

23. The method of claim 16 wherein the first signal has a different frequency than the composite signal.

24. The method of claim 16 wherein applying the nonlinear conversion to the first signal includes
   approximating the nonlinear characteristics of a transmitter power amplifier;
   approximating the nonlinear characteristics of a receiver chain; and
   adaptively approximating the linear characteristics of the receiver chain.

25. A transceiver comprising:
   an intermodulation cancellation circuit configured to receive a first transmit signal,
      apply a linear and nonlinear conversion and a normalization based on a power level of a transmit signal predicted at an analog-to-digital conversion in a transmit leakage path of a composite signal to the first transmit signal to obtain an interference cancellation signal,
      receive the composite signal from a receiver down-conversion circuit, and
      subtract the interference cancellation signal from the composite signal to obtain a desired receive signal.

26. The transceiver of claim 25 further comprising:
   a transmitter up-conversion circuit for modulating and amplifying transmit signals; and
   the receiver down-conversion circuit for demodulating and amplifying received signals.

27. The transceiver of claim 26 further comprising
   a switch coupled to the transmitter up-conversion circuit and the receiver down-conversion circuit for coupling transmit signals to an antenna and receiving received signal from the antenna.

28. The transceiver of claim 25 wherein the interference cancellation signal is subtracted from the composite signal at baseband.

29. The transceiver of claim 25 wherein the composite signal includes a bleed-over signal from the transmitter up-conversion circuit.

30. The transceiver of claim 25 wherein the composite signal includes an amplitude modulated bleed over signal, a jammer signal, and a receive signal.

31. The transceiver of claim 25 wherein the interference cancellation signal removes second order interference from the composite signal.

32. The transceiver of claim 25 wherein the interference cancellation signal removes third order interference from the composite signal.

33. The transceiver of claim 25 wherein applying the linear and nonlinear conversion to the first transmit signal includes
   approximating the linear and nonlinear characteristics of the transmitter up-conversion circuit; and
   approximating the linear and nonlinear characteristics of the receiver down-conversion circuit.

34. The transceiver of claim 25 wherein the intermodulation cancellation circuit is turned off when the transmit signals are below a certain power threshold.

35. A non-transitory machine-readable medium containing instructions for reconstructing and canceling intermodulation interference signals at baseband, when executed by a processor, cause the processor to perform operations comprising:

apply a linear and nonlinear conversion and a normalization based on a power level of a transmit signal predicted at an analog-to-digital conversion in a transmit leakage path of a composite signal to a first signal to obtain an interference cancellation signal; and subtract the interference cancellation signal from the composite signal to obtain a desired receive signal.

36. The non-transitory machine-readable medium of 35 wherein the nonlinear conversion approximates the linear and nonlinear characteristics of a transmitter up-conversion circuit, and approximates the linear and nonlinear characteristics of a receiver down-conversion circuit.

* * * * *